United States Patent [19]
Green

[11] 3,812,920
[45] May 28, 1974

[54] SOIL-LOOSENING ROTARY HOE

[76] Inventor: Helen R. Green, Council Bluffs, Iowa

[22] Filed: Aug. 14, 1972

[21] Appl. No.: 280,719

[52] U.S. Cl.............................. 172/350, 172/555
[51] Int. Cl............................................. A01b 21/08
[58] Field of Search....... 172/350, 349, 15, 68, 120, 172/123, 540, 555, 604

[56] References Cited
UNITED STATES PATENTS

| | | |
|---|---|---|
| 994,707 | 6/1911 | Meissner.......................... 172/120 X |
| 1,266,617 | 5/1918 | Parsons............................ 172/350 X |
| 2,128,077 | 8/1938 | Custer.............................. 172/350 X |
| 2,593,341 | 4/1952 | Phipps............................ 172/349 X |

Primary Examiner—Stephen C. Pellegrino
Attorney, Agent, or Firm—Hiram A. Sturges

[57] ABSTRACT

A rotary hoe having a rotating disc with blades on its right and left sides, each blade having a sharp ground-penetration edge facing away from the axis of the disc and inclined with respect to the disc as seen in front view, and inclined with respect to the radius of the disc as seen in side elevation, said hoe having an elongated handle means provided with right and left arm engaging portions disposed above right and left hand grips.

16 Claims, 5 Drawing Figures

PATENTED MAY 28 1974 3,812,920

SOIL-LOOSENING ROTARY HOE

FIELD OF THE INVENTION

This invention is in the field of rotary cultivators for cultivating gardens.

DESCRIPTION OF THE PRIOR ART

Rotary cultivating tools of the prior art have sometimes been designed with an inclined handle and having a plurality of discs rotating about an axis with each disc provided with blades extending transversely and at an angle to the plane of the respective discs. However, such a cultivator has the disadvantage that dirt can lodge in the discs causing a clogging. Such clogging is more pronounced when the ground is moist.

In those prior art cultivators in which the blades are extended, one blade to the left and an adjacent blade to the right of the plane of the disc, the shape proposed for each blade has been a flat shape. To my knowledge those cultivators which have had blades arranged as thus described have had blades which have a flat shape and which thereby penetrate the ground with a greater difficulty than is necessary.

A further disadvantage of prior art rotary cultivators has been the absence from the bladed discs of the feature of having the disc itself extend beyond the blades which is a feature that assists the rolling of the discs.

A further disadvantage of having multiple discs disposed along side each other in a rotary cultivator is that the excessive width of the cultivation tool prevents its being maneuvered btween plants which are closely spaced. Particularly this is the problem in cross cultivation, cross-wise of the rows of crop and between the plants.

When a rotary disc cultivator for gardening has multiple discs then a dilemma occurs — either the discs must be close together to allow the hoe to be maneuverable between closely spaced plants (and, therefore, the discs are excessively close together so that moist dirt will catch therebetween causing clogging), or if the discs are spaced far enough apart to prevent clogging, then they are so far apart that the tool is so wide is cannot maneuver between closely spaced plants.

SUMMARY OF THE INVENTION

A rotary hoe having a rotating disc with blades on its right and left sides, each blade having a sharp ground-penetration edge facing away from the axis of the disc and inclined with respect to the disc as seen in front view, and inclined with respect to the radius of the disc as seen in side elevation, whereby the absence of miltiple discs eliminates the prior art clogging problem.

The rotary hoe of this invention has its blades concave on the forward sides which causes them to penetrate the ground more easily since the motion of each blade as it approaches the ground is based on an arcuate motion anyhow since the disc rotates in an arc. This concavity of the forward sides of the blades provides the further advantage of easier release of dirt and, therefore, lesser clogging because since they penetrate the ground easier, the dirt moving from the ground across blades more freely will push dirt already on the blades off of the blades more easily, thus more effectively, causing the dirt exchange and the elimination of clogging.

The hoe having an elongated handle means provided with right and left arm engaging portions disposed above right and left hand grips to engage the forearm of a gardener to increase the pressure that can be easily applied to the hoe, whereby a gardener can operate the how while standing erect and walking, as is very important for those aged gardeners who so badly need the recreational therapy of gardening and who often cannot work in a bent position needed for operating hoes having ordinary handles.

DESCRIPTION OF THE PREFERRED EMBODIMENT

Figure 1:
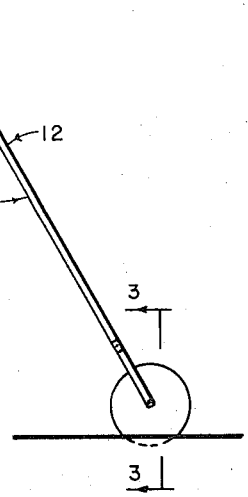
FIG. 1 is a side elevation of a rotary hoe of this invention shown partially penetrated into the surface of the ground, that portion of the ground surface which is disposed beneath the lowest part of the blade being shown in dotted line.
Figure 2:
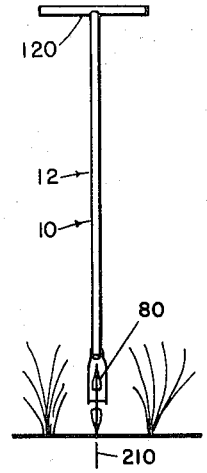
FIG. 2 is a frontal elevation of the hoe of FIG. 1 shown between two plants, just before it is pressed into the ground.

The soil loosening rotary hoe of this invention is generally indicated at 10 in FIGS. 1 and 2, and comprises an elongated handle-beam assembly, generally indicated at 12, having a forwardly extending forked assembly, generally indicated at 14, and forming the forward end of the handle beam assembly 12.

The forked assembly 14 has side bars 20 which have bearings 22 at their forward ends and which rotatably support an axle 26, which has an axis 30 disposed at a right angle to the length of the elongated handle assembly 12.

A rotating ground-engaging member 48 having as a part thereof a hub means or circular rotating disc 50 is fixed to the axle 26 and is disposed at a right angle to the axis 30, and in alignment with the elongation of the handle assembly 12. The disc 50 is sharpened around its circumference as seen at 52 for good ground penetration.

Figure 4:
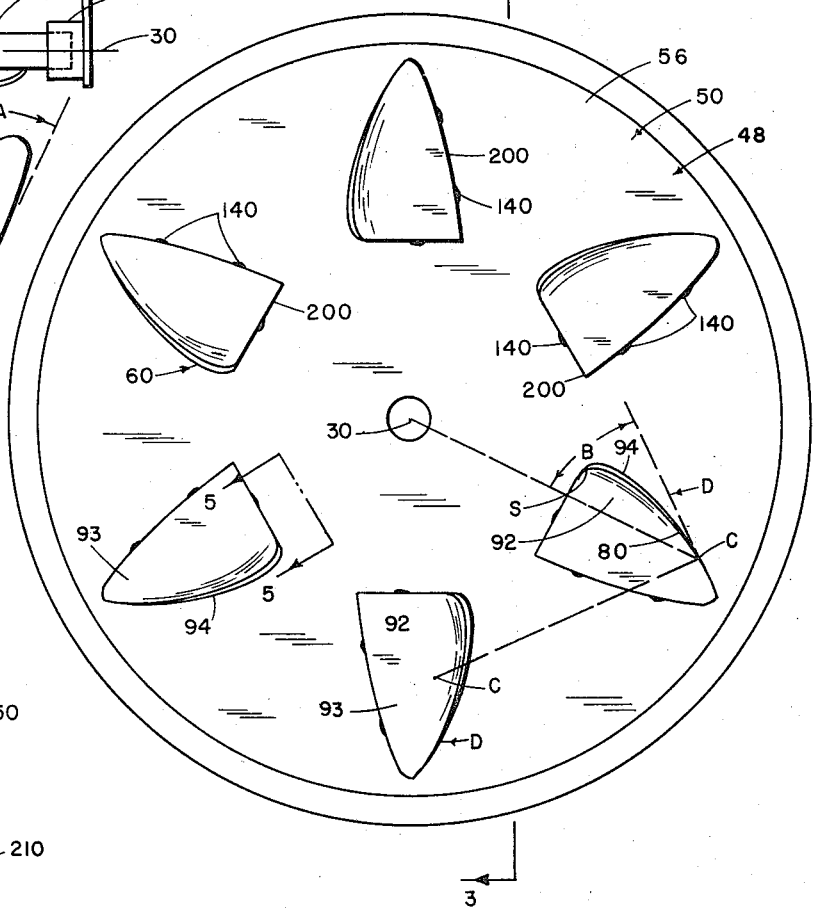
FIG. 4 is a side elevation of a disc of the rotary hoe.

A set of blades 60 can be seen in FIG. 4 on the right hand side of the disc 50, the right hand side being shown at 56.

Figure 3:
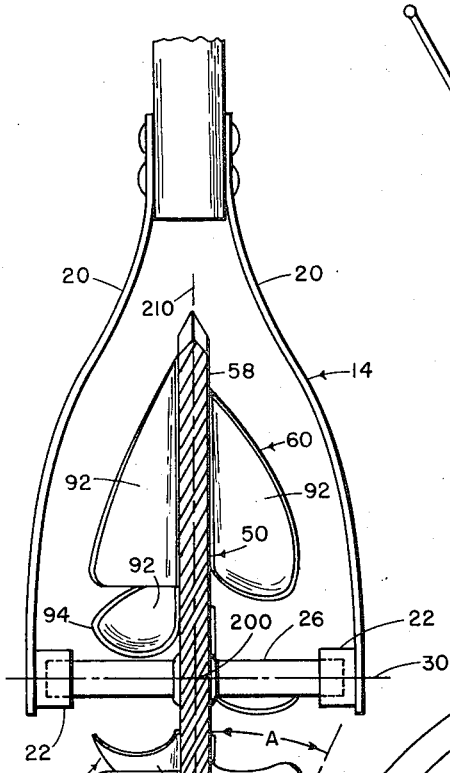
FIG. 3 is a sectional view of the lowermost part of the rotary hoe of this invention shown as it would be seen along the line 3—3 of the diagrammatic view of FIG. 1 or along the line 3—3 of the disc as seen in FIG. 4, as regards the disc portion itself.

Another set of blades 60 can be seen in FIG. 3 on the left hand side 58 of the disc 50.

The blades on the right hand side can be called a set of blades and the blades on the left hand side can be called the left hand side set of blades. Each set of blades has its blade spaced around the axis 30 of the disc 50, and its blades are attached to and project from the respective side of the disc 50.

Each of the blades 60 has a ground-penetration edge 80, facing at least partially away from the axis 30 as best seen in FIG. 3.

The ground-penetration edge 80 is thin enough for substantial ground penetration in manual use and preferably is sharpened substantially for easier penetration into the soil.

The ground-penetration edge 80 of each blade is inclined at an acute angle A, seen in FIG. 3, with respect to the disc, the angle A being approximately 30 degrees. This sharp angle makes for easy penetration of the soil.

It is important to observe that the hoe 10 has only a single disc 50 to avoid the excessive width which two discs would make, as would cause the tool to have a bulk at its lower end, making it fit between plants less easily. A single disc has a further advantage in that the clogging of material between two discs is impossible when there is only one disc.

Each of the blades 60 has a forward side 92, the forward sides 92 being identifiable as that side of each blade which faces in a rearward direction during hoeing operation at times when that respective blade is disposed downwardmost, the rearward direction referring to being at times later herein referred to as a certain direction for claiming purposes.

The forward side 92 of all of the blades 60 face in the same direction at times when each is disposed downwardmost.

Each of the blades are disposed such that its forward side 92 engages the ground with more pressure than its rearward side, whereby a scooping effect on the ground is achieved, which latter is enhanced because of the forward sides 92 being each concave, whereas the rearward side 94 of each blade is convex. One might say that each blade has the shape of the blade portion of a tablespoon substantially, although this would not be exactly accurate either as the drawings will show.

As best seen in FIG. 4 the forward side of that one-third portion of each of the blades 60, which is disposed outermost from the axis 30, as inclined with respect to a radius R, shown in dotted lines in FIG. 4, of the disc 50 at an acuate B angle of approximately 20° to 60°, and preferably approximately 40°, for ease of penetration into the ground in consideration of the motion of a blade during operation, which I consider to be a motion which is in effect a rotation of a certain blade such as the blade shown at S in FIG. 4, which is beginning penetration into the ground above the area center C of the below-ground portion of that previous blade to have entered the ground, which is disposed downwardmost at a time when the blade which is starting to enter the ground, and indicated at S, is beginning to penetrate the ground. In FIG. 4 the downwardmost blade is the one indicated at D and its area center is shown at C.

At the top of the elongated handle assembly 12 is a handle bar 120, which is disposed transversely to the elongation of the handle assembly 12, or in other words, horizontal, so that an operator can grip the handle bar 120 with his right hand on his right side and with his left hand on his left side for pushing the hoe forward.

Each of the blades can be manufactured separately from the disc and attached thereto by welding as seen at 140.

As best seen in FIG. 4, each blade has a forward side 92 which is concave along portions 93 thereof disposed inwardly toward the axis 30 from the periphery of the disc 50, the concave portions 93 being concave on those sides of each which face in one direction of rotation for penetrating the ground more easily, the said one direction being toward the forward side 92 of each blade. The concave portions 93 being concave for penetrating the ground more easily.

As best seen in FIG. 1, the forked assembly 14 is so disposed that the handle beam assembly 12, which latter is elongated, extends upwardly at an acuate angle with respect to the horizontal a distance substantially sufficient for a substantially erect human operator to hold an upper section of the handle beam assembly 12, in the manner earlier described, in his hands while the ground-engaging rotating member 48 is on the ground. The hoe, in general, is of a total size adapting it for manual operation.

The rotating member 48 has its hub means or disc 50 provided with an axis of rotation 30 and the hub means or disc 50 is journalled to the forked assembly 14 for rotation about the axis 30 with the handle beam assembly 12 disposed at substantially a right angle, generally, to the axis 30. It will be seen that the rotating ground-engaging member 48 is adapted to rotate as a unit as it is rolled across the surface of the ground, and that the handle-beam assembly, generally indicated at 12, is of a length for extending from the forked assembly 14 upwardly and at an acute angle with respect to the horizontal, as best seen in FIG. 1, a distance substantially sufficient for a substantially erect human operator to hold an upper section of the handle-beam assembly 12 in his hands while the the ground-engaging rotating member 48 is on the ground.

It is very important that the hoe be of a total size adapting it for manual operation since the tool is designed to go in small places between plants where there is danger to the spreading roots of plants which are more closely spaced, even though the stems of plants are relatively more widely spaced.

The handle-beam assembly 12 is elongated and is disposed at substantially a right angle to the axis 30 and the two sets of blades 60 disposed on the right and left of each other and on the right and left of the disc 50, each substantially define a separate blade swath. There are, therefore, two separate blade swaths, one made by each of the sets of blades 60, and no more blade swaths are shown, since that would increase the width of the hoe and interfere with its ability to dig in a tighter or smaller place between plants without damaging the spreading roots of the plants. The narrowness of the total rotating ground-engaging member 48 is important, therefore, for this reason of being able to operate in close spaces without damaging roots.

The forward side 92 of a blade 60 faces forwardly with respect to the entire hoe at times when it is upwardly disposed in its rotation, but faces rearwardly when the blade is downwardly disposed in its rotation. The forward side of a blade 60 is, therefore, to be distinguished, to avoid confusion, from the forward side of the entire hoe 10.

Figure 5:
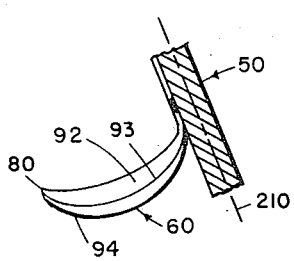
FIG. 5 is a sectional view of the disc as it would be seen along the line 5—5 in FIG. 4.

In FIG. 3, the hub means or disc 50 can be seen to have a center 200 along the axis 30 through which a vertical reference plane can be considered to extend, as seen at 210, extending at a right angle to the axis 30. As the hole is seen from its forward side in FIG. 2 but also as seen in FIGS. 3, 4, and 5, each of the blades 60 has an outer edge 80 disposed farthest from the vertical reference plane 210, the outer edge 80 being inclined at the acute angle A, seen in FIG. 3, with respect to the reference plane 210 beginning with that outermost end of a blade 60, which is seen at 222 in FIG. 3 and which is disposed farthest from the axis 30, being at a point substantially adjacent to the reference plane 210, as seen in FIG. 3, separated therefrom by a very thin half-portion of the disc 50. The outer edge 80 inclines at substantially an acute angle A further and further away from the reference plane 210 as the axis 30 is approached along the outer edge 80 from the outermost end 222 of the blade 60, the angle A being approximately 30°.

The disc 50 has a right hand side 56 and a left hand side 58, each of which are planar and, therefore, can be considered to represent side-planes of the hub-means or disc 50 and which are each disposed at a right angle to the axis 30, the first and second sets of blades 60 being attached to the respective right and left sides of the disc so as to balance the hoe.

As best seen in FIG. 4, the entire periphery of the disc is illustrated as being free of serrations and, therefore, it can also be said that over three-fourths of the periphery of the disc is free of serrations.

Referring to FIG. 4, it can be seen that each blade 60 has its forward side 92 provided with a continuous gradually curving concave surface for giving each blade an ease of ground penetration.

In FIG. 3, it can be seen that the disc 50 is sharpened in a manner at its periphery for causing a lesser disc-edge swath for easier penetration of the soil.

In FIG. 4, it can be seen that the disc 50 projects away from the axis 30 beyond all of the blades 60 so that first ground penetration is made by the disc 50 whereby the entire rotating ground-engaging member or rotating member 48 rolls on the edge of the disc.

I claim:

1. A soil loosening rotary hoe comprising: an elongated handle-beam means having a forked means, said hoe having only one rotating ground-engaging member adapted to rotate as a unit as it is rolled across the surface of the ground, said handle-beam means being of a length for extending from said forked means upwardly and an acute angle with respect to the horizontal a distance substantially sufficient for a substantially erect human operator to hold an upper section of said handle-beam means in his hands while said rotating member is on the ground, said hoe being of a total size adapting it for manual operation, said rotating member having a hub means, said hub means having right and left sides having an axis extending from right to left and being journalled to said forked means for rotation about said axis, said handle-beam means being disposed at substantially a right angle to said axis, first and second sets of blades disposed to the right and left of each other and attached to said hub, said blades of each set being substantially disposed for following in the same swath as other blades in the same set and offset along said axis from the swath of blades in the other set as said hub rotates, said hoe being free of any other sets of blades beyond said first and second sets for narrowness for working in small places, each said blade having a forward side, the forward side of each blade being identified as that side thereof which faces in a rearward direction when the respective blade is disposed downwardmost, each of said blades having a certain one-third portion which is disposed outermost from said axis, said certain one-third portion of each blade having its forward side inclining as seen from a respective one of said right and left sides of said hub means with respect to a certain radius of said hub means which certain radius extends through a center of said certain one-third portion at a certain acute angle with respect to the respective radius.

2. The hoe of claim 1 further comprising said hub means having a center along said axis through which a vertical reference plane extends at a right angle to said axis, as said hoe is seen from its forward side each of said blades having an outer edge disposed farthest from said vertical reference plane, said outer edge of each blade being inclined at an acute angle with respect to said reference plane beginning with that outermost end of the respective blade which is disposed farthest from said axis being at a point substantially adjacent said reference plane, and said outer edge inclining at substantially an acute angle further and further away from said reference plane as said axis is approached along said outer edge.

3. The hoe of claim 2 in which said acute angle of said outer edge is approximately 30°.

4. The hoe of claim 1 further comprising: said hub-means comprising a disc havng right and left sides which latter are substantially disposed in side-planes which latter are each at a right angle to said axis, said first and second sets of blades being attached to respective right and left sides of said disc so as to balance said hoe.

5. The hoe of claim 4 further comprising over three-fourths of the periphery of said disc being free of serrations.

6. The hoe of claim 1 further comprising: each of said blades having their said forward sides concave so as to have a scooping effect.

7. The hoe of claim 6 further comprising: the forward sides of said blades having a continuous surface with a gradual curvature for ease of penetration.

8. The hoe of claim 1 in which the periphery of said disc is sharpened in a manner causing a lesser disc-edge swath for easier penetration.

9. The hoe of claim 1 in which said certain angle is approximately 40°.

10. The hoe of claim 1 in which said blades each respectively have a ground penetration edge disposed farthest from the blades of the other set, said penetration edges being substantially sharpened for easier penetration.

11. The hoe of claim 1 further comprising said hub means having a center along said axis through which a vertical reference plane extends at a right angle to said axis, as said hoe is seen from its forward side each of said blades having an outer edge disposed on that side of each blade which is farthest from said vertical reference plane, said outer edge of each blade being inclined at an acute angle with respect to said reference plane beginning with that outermost end of the respective blade which is disposed farthest from said axis being at a point substantially adjacent said reference plane, and said outer edge inclining at substantially an acute angle further and further away from said reference plane as said axis is approached along said outer edge, said hub-means comprising a disc having right and left sides substantially disposed in side-planes at a right angle to said axis, said first and second sets of blades being attached to respective right and left sides of said disc so as to balance said hoe, each of said blades having their said forward sides concave so as to have a scooping effect, the forward sides of said blades having a continuous surface with a gradual curvature for ease of penetration.

12. The hoe of claim 4 in which said disc projects away from said axis beyond all of said blades so that first ground penetration is made by said disc, and whereby said rotating member rolls on the edge of said disc.

13. The hoe of claim 1 in which said certain acute angle is approximately 20° to 60° for best penetration because of the motion of a blade during operation.

14. The hoe of claim 11 in which said certain acute angle is approximately 20° to 60° for best penetration because of the motion of a blade during operation.

15. The hoe of claim 14 further comprising over three-fourths of the periphery of said disc being free of serrations.

16. The hoe of claim 7 further comprising over three-fourths of the periphery of said disc being free of serrations.

* * * * *